Patented Feb. 17, 1931

1,793,304

UNITED STATES PATENT OFFICE

SYLVESTER BOYER, OF LYNN, MASSACHUSETTS, ASSIGNOR TO GENERAL ELECTRIC COMPANY, A CORPORATION OF NEW YORK

PROCESS FOR PURIFYING NITROBENZENE

No Drawing. Application filed February 19, 1927, Serial No. 169,683. Renewed February 16, 1929.

My invention relates to the purification or conditioning of dielectric materials such as oils, nitro-benzene, nitro-toluene and other organic or inorganic liquids in general which may be used as an insulating medium for electric condensers, cables and the like.

The invention is not limited to the purification of materials that are liquid at ordinary temperature, but applies as well in connection with the purification of any material which may be liquefied by the application of heat, such for example as coumarin, alpha-naphthylamine and the like. I find, for example, that nitro-benzene may be purified so as to increase its specific resistivity or its dielectric strength, or both, by filtering the liquid through a material such as fuller's earth. In a prior application I have pointed out that aluminum oxide may be used for purifying nitro-benezene and other such dielectric materials. I find that by the use of aluminum oxide particularly effective results are obtained in the purification of the materials above indicated. However aluminum oxide is expensive and I find that the same, or substantially the same results may be obtained by first filtering the material through fuller's earth and thereby removing a very large per cent of the impurities such as water. If thereafter the nitro-benzene is filtered through aluminum oxide the same beneficial results, or substantially the same beneficial results are obtained as though the liquid had been filtered through aluminum oxide alone. The advantage in using fuller's earth of course is that fuller's earth is much cheaper and also that the purification process in connection with fuller's earth is much more simple and consequently more expeditious and less expensive. It will be understood that I do not wish to be limited to the use of fuller's earth and aluminum oxide inasmuch as in place of the aluminum oxide I may substitute one of the basic oxides such as calcium oxide, barium oxide and the like. Furthermore, in place of fuller's earth I may substitute other absorbent materials, such as carbon. The materials that I have mentioned for purifying the liquid I find have the property of removing or absorbing from the liquids such impurities as water, acids, resins and the like which affect the specific resistivity and dielectric strength. By thus removing the impurities in such dielectric materials I can effectively increase both the specific resistivity and the dielectric strength of the liquid. I have found that it is not essential that the liquid which is to be purified should be first passed through fuller's earth and then through aluminum oxide inasmuch as I have found that substantially the same results may be obtained by mixing fuller's earth with aluminum oxide. However, I find it desirable that as the last step in the process, the fluid should be treated with aluminum oxide or some one of the basic oxides. In this step in the process the material to be purified is heated with the aluminum oxide at a suitable temperature. In the case of nitro-benzene, nitro-toluene and the like I use a temperature preferably in the neighborhood of from 80 to 100 deg. C. As a last step in the process the nitro-benzene or other fluid is drawn off but preferably distilled. The distilling operation in the case of nitro-benzene and the like is preferably conducted under partial vacuum with a temperature of distillation in the neighborhood of from 140 to 160 deg. C.

More in detail, the method that I have found convenient for carrying out the purification process of the dielectric materials above enumerated is as follows: I place the ingredient which is to serve as a purifying medium, such as the fuller's earth, in a glass tube. I find it convenient to taper the lower end of the tube. The tapered section is then filled with glass wool which serves as a support for filter paper. The tube is then partly filled with the filtering medium on top of the filter paper. The height of the column of the filtering medium may, of course, be varied. The cross section of the filtering medium may also be varied depending upon the speed at which it is desired to have the dielectric material that is being purified pass through. Obviously with a long column and a narrow cross section the rate of filtration will be slower than with a shorter column and a much larger cross section. The rate of filtration is determined, of course, by the degree of purification desired at each operation. If the material is allowed to filter slowly, probably it will be necessary to filter only once. If the filtration is allowed to take place at a much greater rate, it may be necessary to filter the dielectric material two or three or more times before the desired degree of purification is obtained.

After the dielectric has been passed through the fuller's earth it is then treated with the aluminum oxide as above indicated and then filtered. At the end of the operation I find that a nitro-benzene, for example, which to start with has a specific resistivity in ohms per centimeter cube for example of $1 \times 10^7$ is so conditioned that the specific resistivity rises to the order of $1.4 \times 10^{10}$. The specific resistivity may by this method be raised to as high as $3.3 \times 10^{10}$ and even as high as $9.1 \times 10^{10}$. By carrying the filtration process two or three times through the fuller's earth alone the specific resistivity of nitro-benzene may be raised to as high as 3 or 4 times $10^9$. On the other hand if carbon is mixed with the fuller's earth the resistivity may be taken as high as $5 \times 10^{10}$ or as high as $9.1 \times 10^{10}$. However, I find that the breakdown voltage of the dielectric material after it has been treated with fuller's earth and carbon may be very materially improved by the subsequent treatment with aluminum oxide or other basic oxide as indicated in the foregoing. Probably one of the results of the treatment of the nitro-benzene with aluminum oxide is the removal of any small traces of sulphur compounds that may be present in the nitro-benzene.

It will be understood that while I have described my invention by citing specific materials, I do not wish to be limited to such materials inasmuch as these may be varied without departing from the spirit or scope of the invention described and covered by the claims contained herein.

What I claim as new and desire to secure by Letters Patent of the United States, is:—

1. The process of purifying nitro-benzene which consists in passing the fluid through fuller's earth, thereafter treating the fluid with aluminum oxide and distilling.

2. The process of purifying nitro-benzene which consists in passing the fluid through fuller's earth and thereafter treating the fluid with aluminum oxide.

3. The process of purifying nitro-benzene which consists in passing the fluid through fuller's earth and thereafter treating the fluid with a basic oxide.

In witness whereof, I have hereunto set my hand this 17th day of February, 1927.

SYLVESTER BOYER.